US009275419B1

(12) United States Patent  (10) Patent No.: US 9,275,419 B1
Aguiar Marcano  (45) Date of Patent: Mar. 1, 2016

(54) METHOD FOR BUILDING, EXPANDING OR COMPLEMENTING A SOCIAL GRAPH BASED ON CONTACT INFORMATION

(75) Inventor: Reinaldo Javier Aguiar Marcano, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 829 days.

(21) Appl. No.: 13/460,699

(22) Filed: Apr. 30, 2012

(51) Int. Cl.
*G06F 15/16* (2006.01)
*G06Q 50/00* (2012.01)
*G06F 17/30* (2006.01)
*H04L 29/08* (2006.01)
*H04L 12/58* (2006.01)

(52) U.S. Cl.
CPC .......... *G06Q 50/01* (2013.01); *G06F 17/30867* (2013.01); *H04L 51/32* (2013.01); *H04L 67/306* (2013.01)

(58) Field of Classification Search
None
See application file for complete search history.

(56) References Cited

U.S. PATENT DOCUMENTS

| | | | | |
|---|---|---|---|---|
| 2007/0255831 A1* | 11/2007 | Hayashi | ............ | G06F 17/30867 709/226 |
| 2008/0306935 A1* | 12/2008 | Richardson | ............. | H04L 51/32 |
| 2009/0070684 A1* | 3/2009 | Aldrich | .................. | G06Q 50/01 715/743 |
| 2011/0113149 A1* | 5/2011 | Kaal | ..................... | H04L 67/104 709/231 |
| 2011/0208822 A1* | 8/2011 | Rathod | ......................... | 709/206 |
| 2012/0198358 A1* | 8/2012 | Carrer | .................... | G06Q 10/10 715/753 |
| 2012/0311036 A1* | 12/2012 | Huhn | ..................... | G06Q 10/10 709/204 |
| 2013/0103758 A1* | 4/2013 | Alison et al. | .................. | 709/204 |

OTHER PUBLICATIONS von Anb, Martin et al; "Veneta: Serverless Friend-of-Friend Detection in Mobile Social Networking," WIMOB '08 Proceedings of the 2008 IEEE International Conference on Wireless & Mobile Computing, Networking & Communication; Oct. 12, 2008; IEEE Computer Society Washington, DC, USA; whole document.*
Carlos, Sean, "How to painlessly import contacts in Facebook, Twitter, LinkedIn and other social sites", Antezeta Web Marketing—Reflections on search engine optimization, web analytics, and web marketing, May 18, 2011, retrieved from <http://web.archive.org/web/20110518170230/http://antezeta.com/news/import-contacts-in-facebook-twitter-linkedin>.
Stein, Martin, "Finally! Import Your Email Addresses into Facebook", NewMediaPlus—business in real time, Dec. 3, 2010, retrieved from <http://www.newmediaplus.net/blog/internet-technologies/335-finally-import-your-email-addresses-into-facebook>.

* cited by examiner

*Primary Examiner* — Thomas Dailey

(74) *Attorney, Agent, or Firm* — McDermott Will & Emery LLP

(57) ABSTRACT

A system and machine-implemented method includes receiving, using the one or more computing devices, a contact list associated with a first account of a first user on a first service, the first user having an account on a social networking site and the first service being different from the social networking site, receiving, using the one or more computing devices, at least another contact list associated with an account of another user, analyzing, using the one or more computing devices, the contact list with respect to the another contact list in order to determine a shared metric between the lists, and based at least in part on the determined shared metric, suggesting to the first user, the another user as a friend in the social networking site.

20 Claims, 5 Drawing Sheets

METHOD FOR BUILDING, EXPANDING OR COMPLEMENTING A SOCIAL GRAPH BASED ON CONTACT INFORMATION

BACKGROUND

The subject disclosure generally relates to the management of a social graph of a social networking site, and in particular, to expanding the social graph of the social networking site.

Social networking sites have allowed people to communicate with one another more easily and more efficiently than ever before. Through social networking sites, users may instantly share items and thoughts with other users with virtually no geographical barriers. Users may also conveniently receive comments from other users on their shared items or their thoughts. As long as users are connected to the Internet, social networking sites provide an effective means to connect with other users throughout the globe.

SUMMARY

The disclosed subject matter relates to a method executed on one or more computing devices, the method comprising receiving, using the one or more computing devices, a contact list associated with a first account of a first user on a first service, the first user having an account on a social networking site and the first service being different from the social networking site, receiving, using the one or more computing devices, at least another contact list associated with an account of another user, analyzing, using the one or more computing devices, the contact list with respect to the another contact list in order to determine a shared metric between the lists, and based at least in part on the determined shared metric, suggesting to the first user, the another user as a friend in the social networking site.

The disclosed subject matter also relates to a system including a data structure comprising a contact list associated with a first account of a first user on a first service, the first user having an account on a social networking site and the first service being different from the social networking site, and at least another contact list associated with an account of another user, where each of the contact list and the another contact list includes one or more contact entries. The system also includes one or more processors and a machine-readable medium comprising instructions stored therein, which when executed by the processors, cause the processors to perform operations comprising retrieving from the data structure the contact list and the another contact list, identifying a black list comprising a predetermined identifier identifying a contact list to ignore, analyzing at least the contact list with respect to at least the another contact list in order to determine a shared metric between the lists, wherein the shared metric is not associated with the predefined identifier, and based at least in part on the determined shared metric, suggesting to the first user, the another user as a friend in the social networking site.

The disclosed subject matter also relates to a machine-readable medium comprising instructions stored therein, which when executed by a machine, cause the machine to perform operations comprising retrieving from a data structure a contact list including one or more contact entries associated with a first account of a first user on a first service, wherein the first user has an account on a social networking site, and wherein the first service is different from the social networking site. The operations also comprise retrieving from the data structure at least two other contact lists, wherein each of the two other contact lists is associated with a different account of a different user, and wherein each of the two other contact lists includes one or more contact entries. The operations further comprise identifying a black list comprising a predetermined identifier identifying a contact entry to ignore, analyzing at least the contact list with respect to at least the two other contact lists in order to determine multiple shared metrics with each of the two other contact lists, wherein the shared metric is not associated with the predefined identifier, and ranking the two other contact lists based on a number of the multiple shared metrics. The operations yet further comprise determining a highest ranked contact list from the ranked two other contact lists, and based at least in part on the determined multiple shared metrics, suggesting to the first user, a user of the highest ranked contact list as a friend in the social networking site.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purposes of explanation, several aspects of the subject technology are set forth in the following figures.

DETAILED DESCRIPTION

Figure 1:
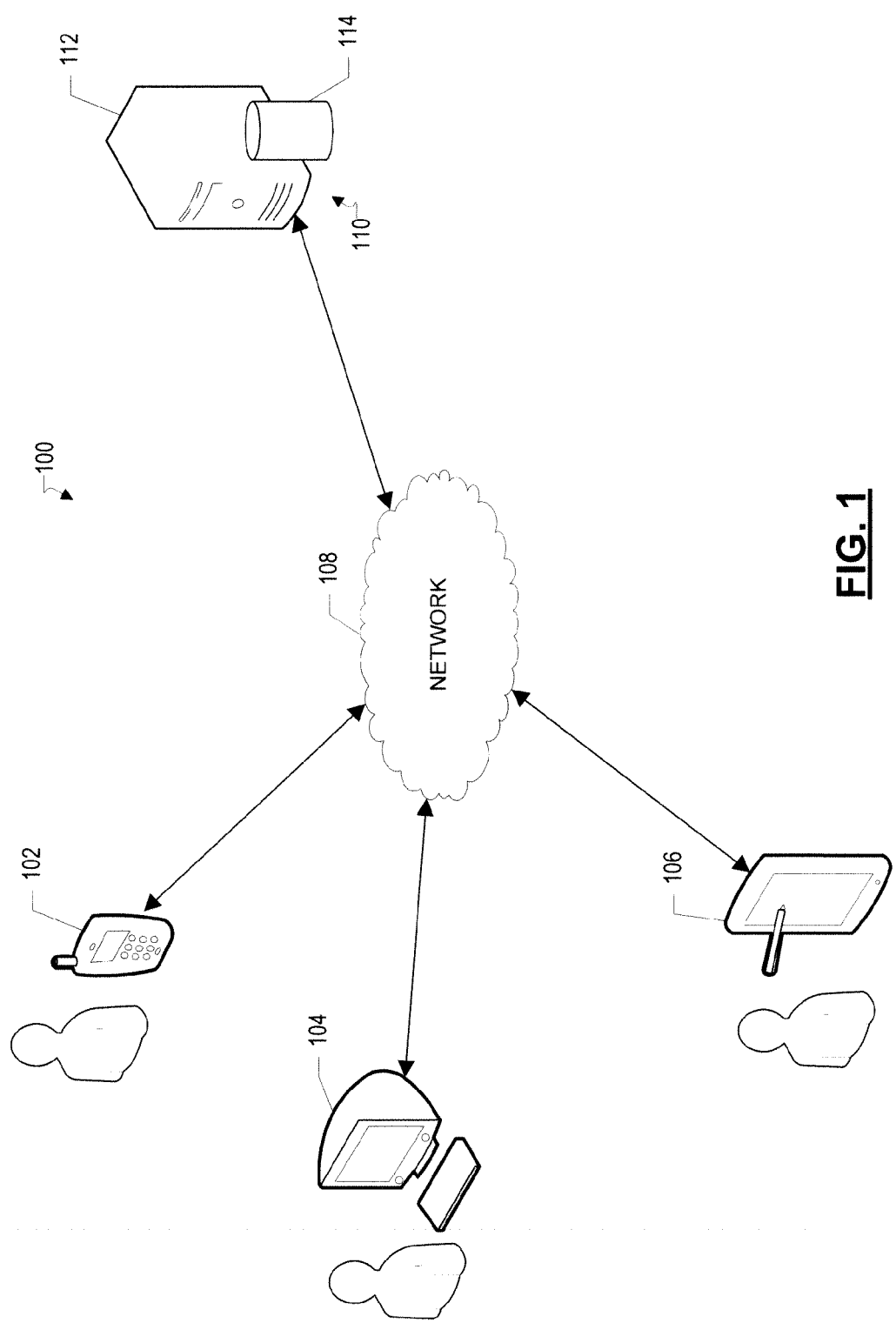
FIG. 1 illustrates an example client-server network environment which provides for building, expanding or complementing a social graph based on contact information.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

I. Overview

It may be a challenge for a user to find other users online who the user may know in the real world or are otherwise socially-related. Social networking sites have attempted to address this issue by utilizing recommendation engines to recommend to the user other users of the social networking site. These recommendation engines recommend other users on the notion that two users may already know each other, or may want to know each other, if they have a mutual "friend" or shared likes/dislikes. However, these engines require that the mutual friend, as well as the two parties being recommended to each other, already be a registered user of the social networking site. For example, if there are people A, X, and B where X is a mutual friend of A and B, existing engines could only recommend A and B to each other only if A, X, and B are all users of the social networking site. If X is not a registered user, then the engines are not able to make the recommendation.

According to the various aspects of the subject technology, a system and method for building, expanding or complementing a social graph based on contact information is provided. The system may build or expand upon a social graph of a social networking site using contact information of the user. The social graph may contain information such as, for example, "friend lists" of the users of the social networking site. The contact information may be a contact list provided by the user and previously stored in the social networking site. The contact information may also be a contact list from another service or a web site such as, for example, an email service, voicemail service, and voice-over-IP ("VoIP") service. The contact information may also be a contact list from a device, such as, for example, cell phones, smart phones, tablets, laptop computers, desktop computers, and portable gaming consoles.

Using the contact lists of different users, the system may determine users having a mutual contact entity, even if the mutual contact entity is not a registered user of the social networking site. The contact entity may be a person or a group, such as, for example, a tennis club or a charity. Determination of the mutual contact entity is made by comparing the contact lists of the two users to determine whether the two contact lists have shared contact entries. Determining whether the two contact entries are shared is made by comparing the "attributes" of the contact entries of the contact list. Each contact entry of the contact list represents a contact entity. A contact entry includes one or more attributes. The attributes are the actual contact information of the contact entity, such as, for example, a telephone number, email address, or physical address. If two contact entries include identical attributes, the two contact entries are determined as shared contact entries. For example, if the contact list A of User A includes a contact list for "Mom" with a telephone number (an attribute) of "415-555-####", and the contact list B of User B includes a contact list for "Wife" with a telephone number (an attribute) "415-555-####", contact list A and B are determined to have shared contact entries, since the contact entries for "Mom" and "Wife" have the same attribute, "415-555-####".

When two users having a mutual contact entity (e.g., the contact lists of the two users have shared contact entries) are determined, the system recommends the two users to each other to add to their friend list. To preserve the privacy of the users, when comparing the contact lists, information (e.g., contact entries or the attributes of the contact entries) may be hashed or otherwise transformed into a unique, or virtually unique, value.

In one aspect of the invention, the system receives, or builds, a black list. The black list contains various terms or other information for identifying certain contact entries that the user wishes to ignore, or the system is designed to ignore, in determining the contact lists with shared contact entries. When determining contact lists having shared contact entries, the system ignores a contact entry if the system determines that the contact entry is identified in the black list. The terms or information in the black list may be chosen such that they correspond to entries for contact entities which are likely to be present in many users' contact lists for non-personal reasons. This allows the system to reduce the chance of suggesting people who are not likely to be socially related. For example, the black list may contain information identifying the profession "dentist". Many users may have the same dentist in their contact list for non-personal reasons (e.g., to make appointments). Therefore, ignoring the dentist as a mutual contact entity increases the likelihood that the system recommends users who are likely to know each other. The use of black lists addresses certain privacy concerns. For example, without a black list, user A may be recommended to user B based on a shared contact entry for a dentist. User B may infer from the recommendation that user A was recommended based on his contact entry for the dentist and may infer that user A has a dental problem. The use of a black list would minimize or eliminate such concerns.

The system may identify multiple contact lists having shared contact entries with a single contact list. In order to increase the confidence that the users of the identified multiple contact lists are socially related to the user of the single contact list, the system may rank the recommendations made from the multiple contact lists based on various methods. The ranks may be determined in a variety of ways, such as, for example, based on the number of contact entities that each of the multiple contact lists have in common with the single contact list. The ranks may also be determined, for example, by looking at profile information of the users of the contact lists. Specifically, the system may look at whether the users have phone numbers associated with the same geographical area, or how frequently each user has communicated with the mutual contact entity. The system may further utilize a weighted combination of the foregoing or other methods for ranking the confidence level of the recommendations.

The phrase "friend" as used herein encompasses its plain and ordinary meaning, including, but not limited to, a user on a social network which another user has mutually made an association with. A friend of a user may have access to certain information of the user or items shared by the user that other users do not have access to. A "friend list" is a list of friends of a given user.

The phrase "social circle" as used herein encompasses its plain and ordinary meaning, including, but not limited to, a group of users on a social network with which a given user has made an association with. Users that are part of the social circle of the given user may have access to certain information of the given user or items shared by the given user that other users do not have access to.

The phrase "social networking site" as used herein encompasses its plain and ordinary meaning, including, but not limited to, an online service, platform or site that focuses on building and reflecting of social associations and interactions among users. These associations may be stored within a social graph at each social networking service (e.g., maintained at system(s) 112). Users of social networking services may create associations with one another (e.g., mutually identify as friends). Such user associations may be defined on a user-to-user basis, or as a group of users associated through membership within a group.

II. Example Client-Server Network Environments for Operating and Accessing a Social Networking Site Hosting the Present System FIG. 1 illustrates an example client-server network environment which provides for building, expanding or complementing a social graph based on contact information. A network environment 100 includes a number of electronic devices 102, 104 and 106 communicably connected to a server 110 by a network 108. Server 110 includes a processing device 112 and a data store 114. Processing device 112 executes computer instructions stored in data store 114, for example, for operating the social networking site.

In some example aspects, electronic devices 102, 104 and 106 can be computing devices such as laptop or desktop computers, smartphones, PDAs, portable media players, tablet computers, televisions or other displays with one or more processors coupled thereto or embedded therein, or other appropriate computing devices that can be used for accessing the social networking site. In the example of FIG. 1, electronic device 102 is depicted as a smartphone, electronic device 104 is depicted as a desktop computer, and electronic device 106 is depicted as a PDA.

In some example aspects, server 110 can be a single computing device such as a computer server. In other aspects, server 110 can represent more than one computing device working together to perform the actions of a server computer (e.g., cloud computing). The server 110 may host the social networking site communicationally coupled to the client device (e.g., electronic devices 102, 104 or 106) via network 108. In one example, the server 110 may host the present system for building, expanding or complementing a social graph based on contact information. The present system (e.g., hosted at server 110) may be installed (e.g., by the user), either as a separate system (e.g., a system communicationally coupled to the social networking site) or as an integrated application within the social networking site.

The network 108 can include, for example, any one or more of a personal area network (PAN), a local area network (LAN), a campus area network (CAN), a metropolitan area network (MAN), a wide area network (WAN), a broadband network (BBN), the Internet, and the like. Further, the network 108 can include, but is not limited to, any one or more of the following network topologies, including a bus network, a star network, a ring network, a mesh network, a star-bus network, tree or hierarchical network, and the like.

Figure 2:
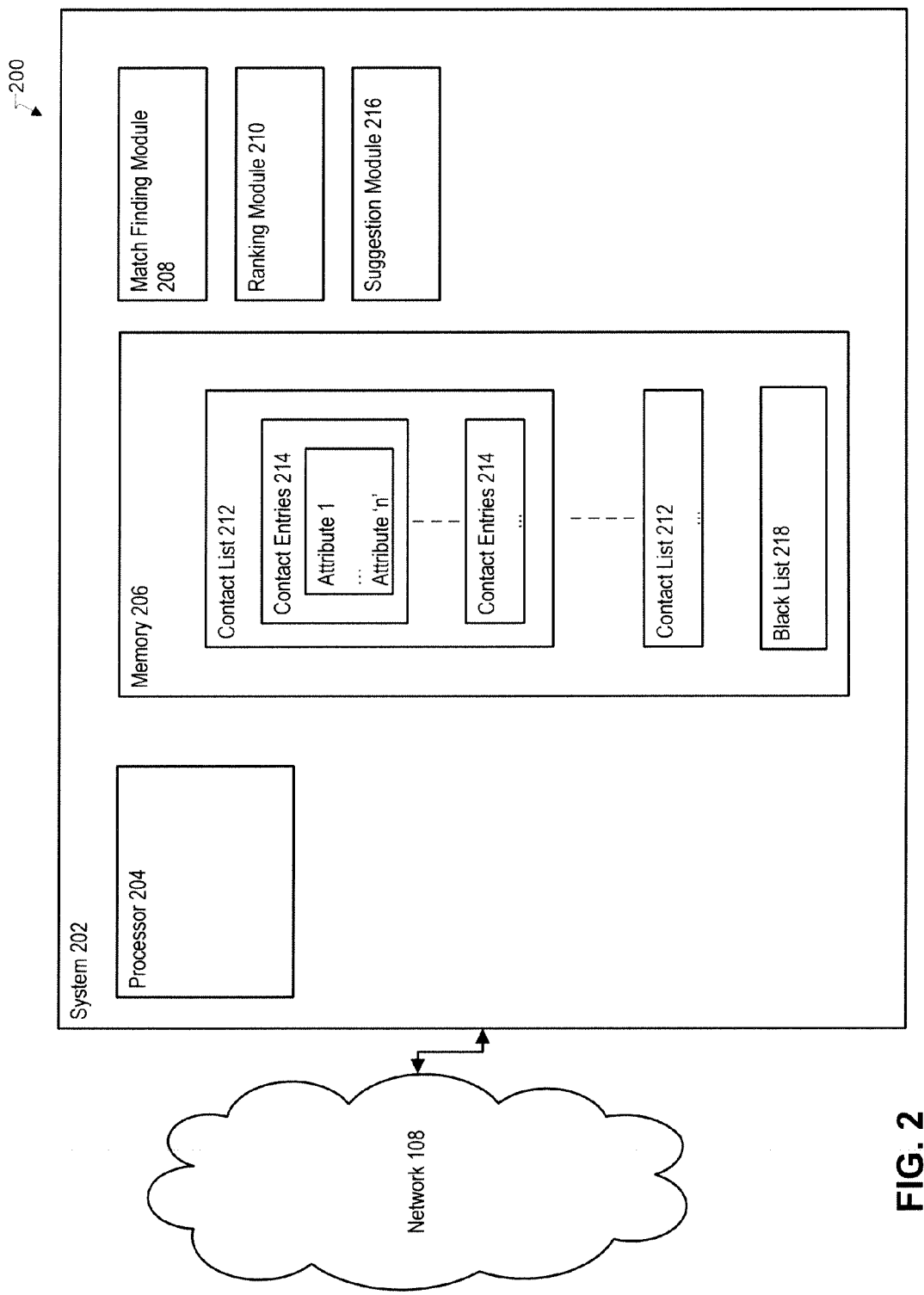
FIG. 2 illustrates a block diagram of an example system for building, expanding or complementing a social graph based on contact information.

III. Example Systems for Building, Expanding or Complementing a Social Graph Based on Contact Information FIG. 2 illustrates a block diagram 200 of an example system 202 for building, expanding or complementing a social graph based on contact information. The system 202 may be hosted, for example, at the server 110. The system 202 includes a processor 204 (e.g., processing device 112) and a memory 206 (e.g., data store 114). The memory 206 may be integrated with the system 202, may be a separate storage medium coupled with the system 202, or may be a combination of both.

The memory 206 stores one or more contact lists 212 of users of the social networking site. Each contact list 212 is associated with a user and stores one or more contact entries 214. Contact entries 214 represent contact entities such as, for example, a person, a group, or other entities for which the user has contact information. Such contact information is stored in the contact entry 214 as attributes. Attributes may be any type of contact information such as, for example, telephone numbers, email addresses, physical addresses, and screen names of instant messaging services. The contact lists 212, or any information stored in the contact lists, may be received from the users of the social networking site, or may be received from other applications or services associated with the users.

The system 202 also includes a match finding module 208 and a ranking module 210. The match finding module 208 stores instructions for comparing a first contact list of the contact lists 212 with other contact lists 212 to identify one or more contact lists having shared contact entries with the first contact list. Shared contact entries are determined by comparing the attributes of the contact entries. For example, if a first contact list of a first user includes a contact entry for a person named John Smith with email "jsmith@abc.com" as one of its attributes, the instructions of the match finding module 208 determines a second contact list for a second user as having a shared contact entry with the first contact list, if the second contact list contains a contact entry having the email "jsmith@abc.com" as one of its attributes. Other attributes may also be used for the comparison.

Two given contact lists may have multiple shared contact entries, and a given contact list may have multiple contact lists sharing at least a contact entry. The ranking module 210 stores instructions for ranking multiple contact lists 212 which have at least one shared contact entry 214 with a given contact list, such that the multiple contact lists are ranked in the order of having a higher likelihood that the users associated with the contact lists know each other in real life, or would want to know each other. The ranking may be determined based on the number of contact entries 214 the two contact lists 212 share. For example, if a contact list X has ten shared contact entries 214 with a contact list A, has five shared contact entries 214 with contact list B, and has one shared contact entry 214 with contact list C, for contact list X, contact list A will be ranked first, contact list B the second, and contact list C the third. The ranking may also be determined based on profile information of the users associated with the contact lists. For example, the system 202 may look at whether the two users have phone numbers associated with the same geographical area, or how frequently each user has communicated with the mutual contact. The system may also utilize a weighted combination of the foregoing methods.

The system 202 may also include a suggestion module 216 storing instructions for suggesting to the given user the users associated with the contact lists 212 identified by the match finding module 208 to add to his or her friend list or social circle. Users of contact lists ranked higher by the ranking module 210 are given priority in the suggestion. For example, if for user X the module 208 identifies contact lists A, B and C associated with users A, B and C, respectively, and the ranking module 210 ranks the contact lists in the order of contact list A, B and C, the suggestion module 216 may first suggest user A to user X. If user X adds user A to his or her contact list or social circle, or refuses to add user A, then the suggestion module 216 may suggest user B, and then user C, in that order. Other methods, algorithms or schemes may also be used to suggest other users to a given user of the social networking site.

The memory 206 may also include a black list 218. The black list 218 stores information for identifying certain contact entries 214, or types of contact entries, to ignore when comparing to determine contact lists having shared contact entries. The information stored in the black list 218 may be predetermined, received from the users of the social network, or may be determined by a predefined algorithm. Contact lists 212 may often store contact entries 214 serving a non-personal purpose. For example, the contact lists 212 may include contact entries for entities with which the user of the contact list has a non-personal relationship, such as the user's dentist, plumber, food delivery service, or other business contacts. Many users may store in their contact lists 212 contact entries 214 of the same dentist, plumber, and food delivery service. However, identifying contact lists 212 sharing the contact entries 214 for these types of entities would have a low likelihood of signifying that the two users know each other in person, or would want to know each other. Therefore, ignoring the contact entries 214 for such contact entities increases the likelihood that the users of contact lists identified as having shared contact entries do in fact know each other or want to know each other.

The instructions of modules 208, 210 and 216 may be executed by the processor 204. The modules 208, 210, and 216 may also be stored in the memory 206 and may be part of other software which may be executed by the processor 204. The modules 208, 210, and 216 may also be implemented as independent hardware modules in communication with the processor 204.

The processor 204 may be configured to execute instructions, such as instructions physically coded into the processor, instructions received from software in the memory 206, or a combination of both. For example, the processor 204 may execute instructions to determine, from among the contact lists 212, a first contact list associated with a first user. The processor 204 may also be configured to execute instructions to compare the first contact list with other contact lists of the contact lists 212 to identify a second contact list having a shared contact entry with the first contact list. Such instructions may be, for example, instructions stored in the match finding module 208. Multiple contact lists having shared contact entry with the first contact list may also be identified. The comparison may be made based on the attributes of the contact entries. When making the comparison, the processor 204 may also execute instructions to identify the black list 218, and ignore a contact entry of the first contact list if the contact entry is identified in the black list. The processor 204 may further be configured to communicate a second user associated with the second contact list to the first user.

The processor 204 is further configured to execute instructions to rank multiple contact lists identified as having shared contact entries with the first contact list. As discussed above, the ranking may be based on the number of the shared contact entries, based on looking at the profiles of the users associated with the contact lists, or a weighted combination of both. Such instructions may be, for example, instructions stored in the ranking module 210.

Figure 3:
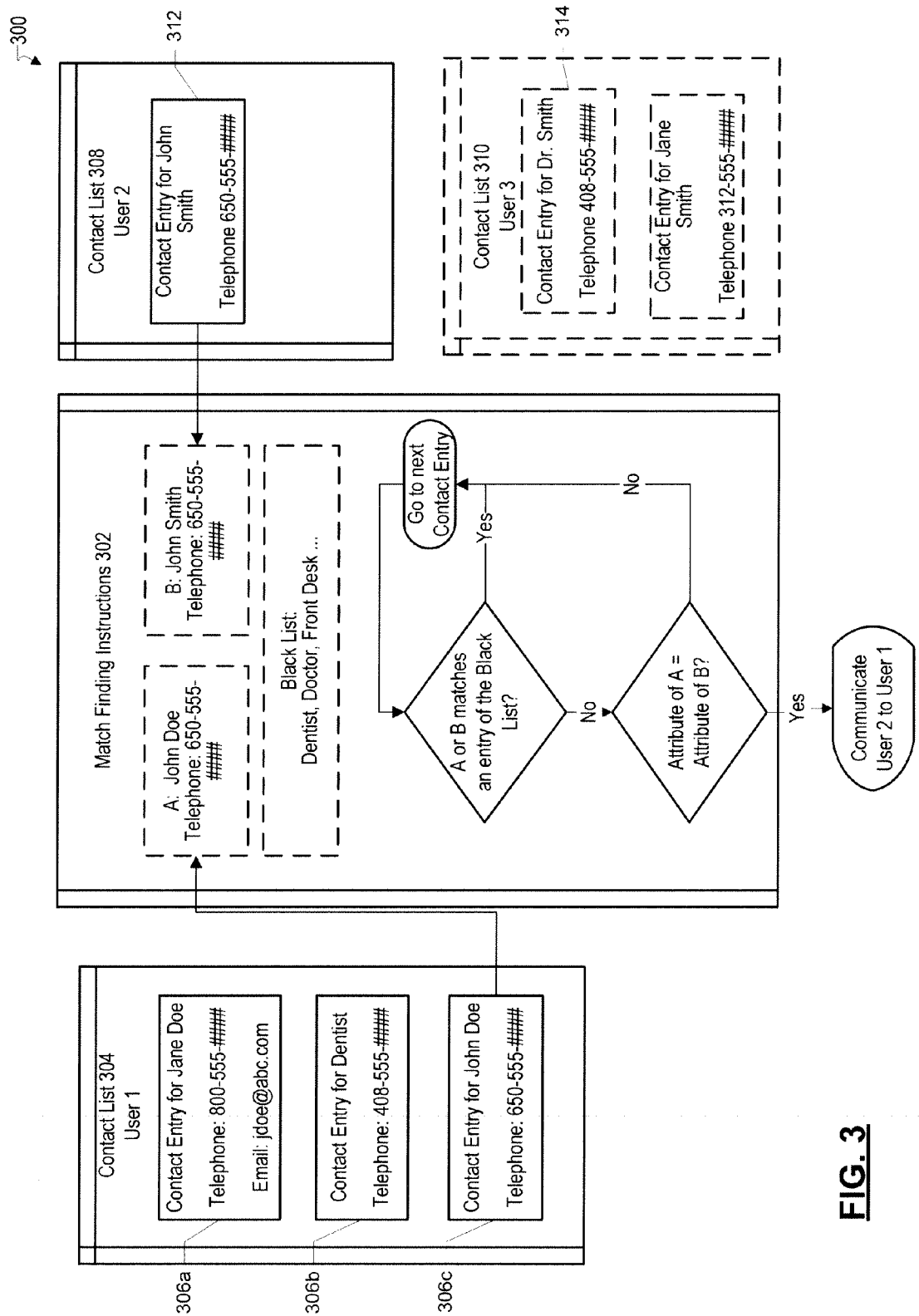
FIG. 3 illustrates a schematic diagram of an example operation of a system for building, expanding or complementing a social graph using contact information.

IV. Example Operations for Building, Expanding or Complementing a Social Graph Using Contact Information FIG. 3 illustrates a schematic diagram of an example operation 300 of a system for building, expanding or complementing a social graph using contact information. The system (e.g., system 202) stores and executes match finding instructions 302. The match finding instructions 302 may be, for example, any combination of instructions stored in the modules 208, 210 and 216. The system executes the instructions 302 to identify a contact list 304 of user 1. The contact list 304 may be, for example, one of the contact lists 212. The contact list 304 in the example of FIG. 3 includes three contact entries 306a-306c. The system also executes the match finding instructions 302 to compare the contact entries 306a-306c of the contact list 304 against other contact lists, such as, for example, contact lists 212, associated with other users of the social networking site.

FIG. 3 shows that contact list 308 of user 2 and contact list 310 of user 3 are compared against the contact list 304. As the contact lists 308 and 310 are compared with the contact list 304, determination is made as to whether the contact lists have any shared contact entries. The shared contact entries are determined by comparing the attributes of the two given contact entries. In the example of FIG. 3, contact list 308 includes a contact entry 312 for an entity named "John Smith". The contact entry 312 includes a telephone number as an attribute. The contact entries 306a-c are for entities named "Jane Doe", "Dentist", and "John Doe", respectively. Entry 306a includes two attributes, a telephone number and an email address, and the entries 306b and 306c each includes one attribute, a telephone number. The system also executes the match finding instructions 302 to compare the attributes of each contact entry of the contact list 304 against attributes of each contact entry of the contact lists 308 and 310 to identify contact entries having the same attributes. In FIG. 3, contact entry 306c and contact entry 312 have the same telephone number, "650-555-####" and therefore have the same attribute. Accordingly, contact lists 304 and 308 are identified as having shared contact entries, namely contact entries 306c and 312. While the contact entries 306c and 312 are for differently named entities "John Doe" and "John Smith", respectively, they are nevertheless determined as shared contact entries since comparison is made based on the attributes of the contact entries.

In one aspect of the invention, the match finding instructions 302 also include instructions for comparing the contact entries against a black list (e.g., black list 218) while comparing the contact lists. The black list includes terms, phrases, or other information for identifying contact entries or types of contact entries to be ignored when the contact lists are compared with each other to find the contact lists having shared contact entries. In the example of FIG. 3, the black list includes the terms "dentist", "doctor" and "front desk". Therefore, while comparing the contact list 304 with other contact lists such as contact list 308 and contact list 310, contact entries including the terms "dentist", "doctor" or "front desk" are ignored and are not used in the comparison. In FIG. 3, the contact list 310 of user 3 includes a contact entry 314 for "Dr. Smith", with an attribute "408-555-####". This attribute is the same as the attribute of the contact entry 306b of contact list 304, which is also "408-555-####". However, the contact entry 306b is for the entity named "Dentist". Since this term matches one of the terms in the black list, contact list 306b is ignored and is not used in the comparison. Therefore, even though contact lists 304 and 310 have a shared contact entity, they are not determined as such.

Therefore, in the example of FIG. 3, only contact list 308 of user 2 includes a shared entry with contact list 304 which also does not include terms found in the black list. User 2 is then communicated to user 1 as a suggested user to be added to his or her friend list or social circle. Instructions for communicating user 2 to user 1 may be stored, for example, in the suggestion module 216.

Figure 4:
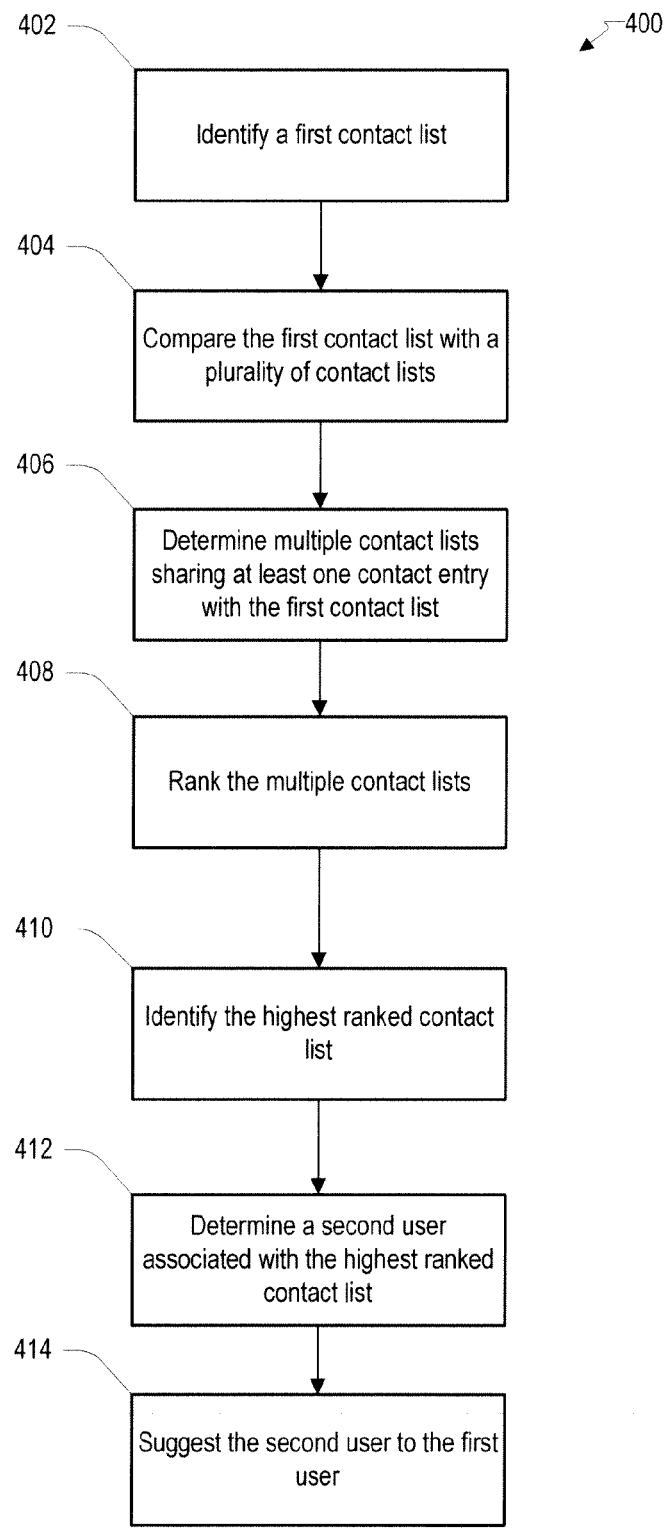
FIG. 4 illustrates a flow diagram of an example process for building, expanding or complementing a social graph using contact information, where multiple contact lists having shared contact entries are identified.

V. Example Processes for Building, Expanding or Complementing a Social Graph Using Contact Information, Including Ranking of Multiple Contact Lists While the example of FIG. 3 shows determining one contact list having one shared contact entry, multiple contact lists each having one or more shared contact lists may also be identified. FIG. 4 illustrates a flow diagram of an example process 400 for building, expanding or complementing a social graph using contact information, where multiple contact lists having shared contact entries are identified. The process may be performed by a system such as, for example, the system 202.

The process 400 begins in block 402 where the system identifies a first contact list associated with a first user (e.g., one of contact lists 212) for which to find another contact list having a shared contact entry. In block 404, the first contact list is compared with other contact lists to find contact lists having a shared contact entry with the first contact list. During the comparison, a black list (e.g., black list 218) may be referenced to ignore any contact entries that are identified in the black list. In block 406, multiple contact lists sharing at least one contact entry with the first contact list is determined, as a result of the comparison in block 404. In block 408, the multiple contact lists identified in block 406 are ranked. Ranking may be done based on the number of the shared contact entries. For example, if contact list X, one of the multiple contact lists indentified in block 406, has three shared contact entries with the first contact list, contact list Y has two shared entries, and contact list Z has one, then the contact lists X, Y and Z are ranked respectively as first, second and third, since X has the most shared contact entries and Z has the least. Other ranking methods may also be used, for example, by looking at the profile of the users associated with the contact lists. The process of block 408 may be performed by the system executing instructions such as, for example, those stored in the ranking module 210.

In block 410, the highest ranked contact list is identified. In block 412, a second user associated with the highest ranked contact list identified in block 410 is determined. In block 414, the second user is suggested to the first user. The process of block 414 may be performed by the system executing instructions such as, for example, those stored in the suggestion module 216. In one aspect of the invention, rather than identifying one highest ranked contact list in block 410, several predetermined number of high ranked contact lists may be determined, and all users associated with these contact lists may be determined and suggested to the first user in blocks 412 and 414.

Many of the above-described features and applications are implemented as software processes that are specified as a set of instructions recorded on a computer-readable storage medium (also referred to as computer-readable medium). When these instructions are executed by one or more processing unit(s) (e.g., one or more processors, cores of processors, or other processing units), they cause the processing unit(s) to perform the actions indicated in the instructions. Examples of computer-readable media include, but are not limited to, CD-ROMs, flash drives, RAM chips, hard drives, EPROMs, etc. The computer-readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

VI. Example Electronic Systems for Building, Expanding or Complementing a Social Graph Based on Contact Information.

Figure 5:
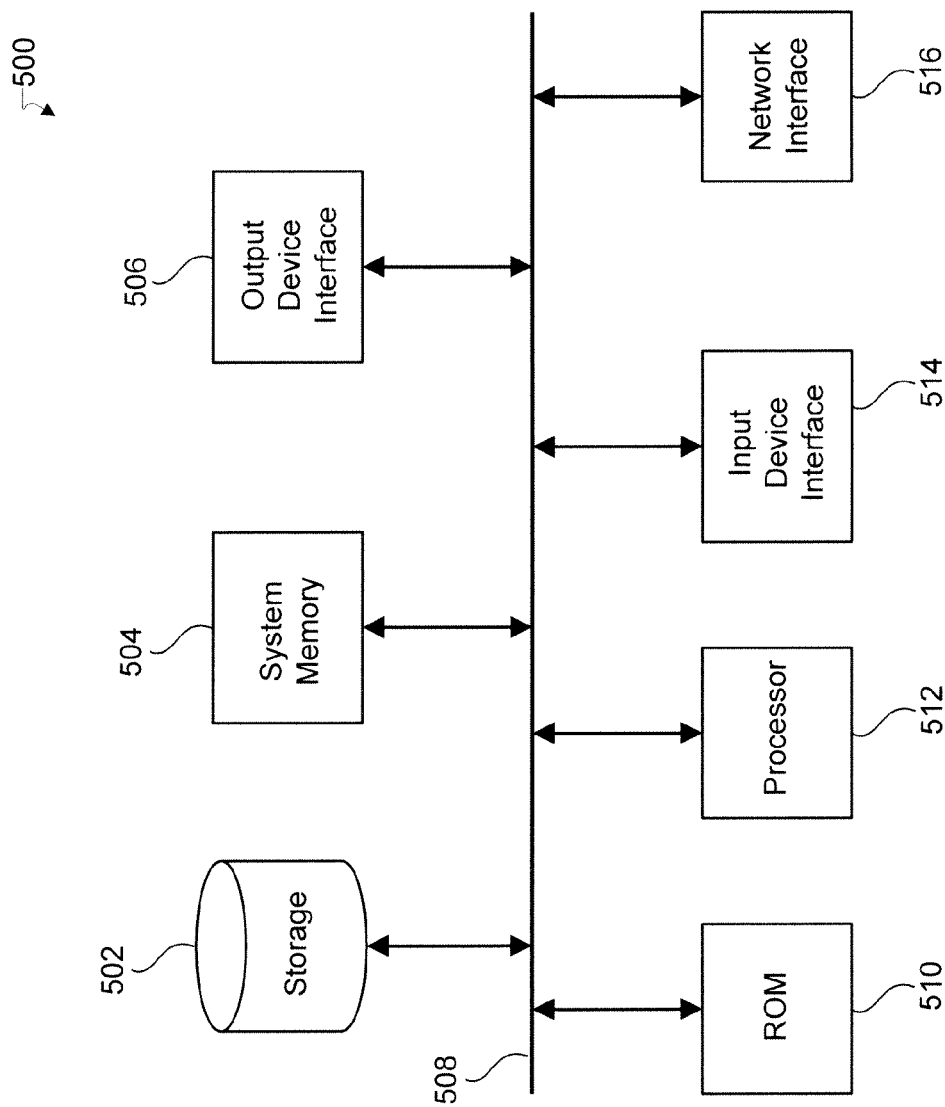
FIG. 5 conceptually illustrates an electronic system with which some implementations of the subject technology are implemented.

FIG. 5 conceptually illustrates an electronic system with which some implementations of the subject technology are implemented. Electronic system 500 can be a computer, phone, PDA, laptop, tablet computer, television with one or more processors embedded therein or coupled thereto, or any other sort of electronic device. Such an electronic system includes various types of computer-readable media and interfaces for various other types of computer-readable media. Electronic system 500 includes a bus 508, processing unit(s) 512, a system memory 504, a read-only memory (ROM) 510, a permanent storage device 502, an input device interface 514, an output device interface 506, and a network interface 516.

Bus 508 collectively represents all system, peripheral, and chipset buses that communicatively connect the numerous internal devices of electronic system 500. For instance, bus 508 communicatively connects processing unit(s) 512 with ROM 510, system memory 504, and permanent storage device 502.

From these various memory units, processing unit(s) 512 retrieves instructions to execute and data to process in order to execute the processes of the subject disclosure. The processing unit(s) can be a single processor or a multi-core processor in different implementations.

ROM 510 stores static data and instructions that are needed by processing unit(s) 512 and other modules of the electronic system. Permanent storage device 502, on the other hand, is a read-and-write memory device. This device is a non-volatile memory unit that stores instructions and data even when electronic system 500 is off. Some implementations of the subject disclosure use a mass-storage device (such as a magnetic or optical disk and its corresponding disk drive) as permanent storage device 502.

Other implementations use a removable storage device (such as a floppy disk, flash drive, and its corresponding disk drive) as permanent storage device 502. Like permanent storage device 502, system memory 504 is a read-and-write memory device. However, unlike storage device 502, system memory 504 is a volatile read-and-write memory, such as random access memory. System memory 504 stores some of the instructions and data that the processor needs at runtime. In some implementations, the processes of the subject disclosure are stored in system memory 504, permanent storage device 502, and/or ROM 510. For example, the various memory units include instructions for filtering email messages according to various aspects. From these various memory units, processing unit(s) 512 retrieves instructions to execute and data to process in order to execute the processes of some implementations.

Bus 508 also connects to input and output device interfaces 514 and 506. Input device interface 514 enables the user to communicate information and select commands to the electronic system. Input devices used with input device interface 514 include, for example, alphanumeric keyboards and pointing devices (also called "cursor control devices"). Output device interfaces 506 enable, for example, the display of images generated by the electronic system 500. Output devices used with output device interfaces 506 include, for example, printers and display devices, such as cathode ray tubes (CRT) or liquid crystal displays (LCD). Some implementations include devices such as a touchscreen that functions as both input and output devices.

Finally, as shown in FIG. 5, bus 508 also couples electronic system 500 to a network (not shown) through a network interface 516. In this manner, the computer can be a part of a network of computers (such as a local area network ("LAN"), a wide area network ("WAN"), or an Intranet, or a network of networks, such as the Internet. Any or all components of electronic system 500 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessors or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer-readable medium" and "computer-readable media" are entirely restricted to tangible, physical objects that store information in a form that is readable by a computer. These terms exclude any wireless signals, wired download signals, and any other ephemeral signals.

To provide for interaction with a user, implementations of the subject technology described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Aspects of the subject technology described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject technology described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Some of the blocks may be performed simultaneously. For example, in certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims.

What is claimed is:

1. A method executed on one or more computing devices, the method comprising:
    receiving, at one or more computing devices, a first contact list from a first service, the first contact list being associated with a first telephone number of a first user, the first user having a first social networking account associated with the first telephone number;
    receiving, at the one or more computing devices, a second contact list associated with a second telephone number of a second user, the second user having a second social networking account associated with the second telephone number;
    determining, at the one or more computing devices, at least one shared attribute between a contact entry shared by the first contact list and the second contact list;
    determining, at the one or more computing devices, that the first telephone number and the second telephone number are associated with a same geographical area; and
    based at least in part on the determined at least one shared attribute and the determination that the first telephone number and the second telephone number are associated with a same geographical area, suggesting to the first user, the second user as a friend in a social networking service.

2. The method of claim 1, wherein the second contact list is associated with at least one account on the first service that is different from the social networking service.

3. The method of claim 1, wherein the first contact list and the second contact list each comprises one or more contact entries, each contact entry including one or more attributes.

4. The method of claim 3, wherein the one or more attributes comprises at least one of a telephone number, email address, or physical address.

5. The method of claim 1, wherein the first contact list and the second contact list each comprises one or more contact entries;
    wherein the method further comprises identifying a black list comprising a predetermined identifier; and
    wherein the determining the at least one shared attribute comprises ignoring a contact entry of the second contact list if the contact entry is associated with the predetermined identifier.

6. The method of claim 1, wherein the second contact list is received from the second user; and
    wherein the method further comprises storing the second contact list in a data structure.

7. The method of claim 1, wherein the second contact list is received from a web-based service; and
    wherein the method further comprises storing the second contact list in a data structure.

8. The method of claim 1, wherein:
    the first contact list and the second contact list each comprises one or more contact entries,
    a contact entry of each of the first contact list and the second contact list are hashed, and
    at least one hashed contact entry of the first contact list is compared against each hashed contact entry of the second contact list.

9. The method of claim 1, wherein the receiving the second contact list comprises receiving a third contact list associated with an account of a third user;
    wherein the determining the at least one shared attribute comprises determining multiple shared attributes for each of the second contact list and the third contact list;
    wherein the method further comprises:
        ranking the second contact list and the third contact list based on a number of the multiple shared attributes, and
        determining a highest ranked contact list from the ranked second contact list and the third contact list; and
    wherein the suggesting comprises suggesting a user associated with the highest ranked contact list.

10. A system comprising:
    a data structure comprising:
        a first contact list from a first service, the first contact list being associated with a first telephone number of a first user, the first user having a first social networking account associated with the first telephone number, and
        a second contact list associated with a second telephone number of a second user, the second user having a second social networking account associated with the second telephone number,
        wherein each of the first contact list and the second contact list includes one or more contact entries;
    one or more processors; and
    a machine-readable medium comprising instructions stored therein, which when executed by the one or more processors, cause the one or more processors to perform operations comprising:
        retrieving from the data structure the first contact list and the second contact list;
        identifying a black list comprising a predetermined identifier identifying a contact list to ignore;
        analyzing at least the first contact list with respect to at least the second contact list in order to determine a shared attribute between a contact entry shared by the first contact list and the second contact list, wherein the shared attribute is not associated with the predetermined identifier;

determining that the first telephone number and the second telephone number are associated with a same geographical area; and based at least in part on the determined shared attribute and the determination that the first telephone number and the second telephone number are associated with a same geographical area, suggesting to the first user, the second user as a friend in a social networking service.

11. The system of claim 10, wherein the second contact list is associated with at least one account on the first service that is different from the social networking service.

12. The system of claim 10, wherein each contact entry of the first contact list and the second contact list comprises one or more attributes.

13. The system of claim 12, wherein the one or more attributes comprises at least one of a telephone number, email address, or physical address.

14. The system of claim 10, wherein the second contact list is received from the second user; and
wherein the operations further comprise storing the second contact list in the data structure.

15. The system of claim 10, wherein the second contact list is received from a web-based service; and
wherein the operations further comprise storing the second contact list in the data structure.

16. The system of claim 10, wherein:
a contact entry of each of the first contact list and the second contact list are hashed, and
at least one hashed contact entry of the first contact list is compared against each hashed contact entry of the second contact list.

17. The system of claim 10, wherein the data structure comprises a third contact list associated with an account of a third user;
wherein the analyzing comprises determining multiple shared attributes for each of the second contact list and the third contact list;
wherein the operations further comprise:
ranking the second contact list and the third contact list based on a number of the multiple shared attributes, and
determining a highest ranked contact list from the ranked second contact list and the third contact list; and
wherein the suggesting comprises suggesting a user associated with the highest ranked contact list.

18. A non-transitory machine-readable medium comprising instructions stored therein, which when executed by a machine, cause the machine to perform operations comprising:
retrieving, from a data structure, a contact list associated with a first telephone number of a first user, the first user having a first social networking account associated with the first telephone number;
retrieving from the data structure at least two other contact lists, wherein the at least two other contact lists are respectively associated with different telephone numbers of different users, the different users having social networking accounts respectively associated with the different telephone numbers, and wherein each of the at least two other contact lists includes one or more contact entries;
identifying a black list comprising a predetermined identifier identifying a contact entry to ignore;
analyzing the contact list with respect to the at least two other contact lists to determine multiple shared attributes with each of the at least two other contact lists, wherein the determined multiple shared attributes are not associated with the predetermined identifier;
ranking the at least two other contact lists based on a number of the determined multiple shared attributes;
determining a highest ranked contact list from the ranked at least two other contact lists;
determining that the first telephone number and at least one of the different telephone numbers are associated with a same geographical area and
based at least in part on the determined multiple shared attributes and the determination that the first telephone number and the at least one of the different telephone numbers are associated with a same geographical area, suggesting to the first user, a user of the highest ranked contact list as a friend in a social networking service.

19. The non-transitory machine-readable medium of claim 18, wherein at least one contact entry of the contact list and at least one of the one or more contact entries of the at least two other contact lists comprises one or more attributes, and wherein the suggesting comprises determining that the determined multiple shared attributes are attributes of contact entries of the at least two other contact lists that are being shared with a contact entry of the contact list.

20. The non-transitory machine-readable medium of claim 19, wherein the one or more attributes comprises at least one of a telephone number, email address, or physical address.

* * * * *